United States Patent Office 2,955,245
Patented Oct. 4, 1960

2,955,245

BATTERY CHARGERS

Ivan Salisbury Payne and Alfred Erwin Reginald Arnot, Basingstoke, England, assignors to Emmanuel Kaye and John Reginald Sharp, both of Basingstoke, England Filed Oct. 2, 1957, Ser. No. 687,696

Claims priority, application Great Britain Oct. 2, 1956

7 Claims. (Cl. 320—35)

This invention comprises improvements in or relating to battery chargers.

As is known on charging a secondary battery it is normally desirable not only to bring the battery to full charging voltage but to maintain the charge current therecharging voltage but to maintain the charge current thereafter for a predetermined further time known as the "gassing period" before cutting out the charger current. It is an object of the present invention to provide a battery charger which will maintain the charge during the "gassing period" and thereafter automatically cut out the charger current without attention from an assistant.

Various devices have been proposed for this purpose previously but the problem offers difficulty because the time of the "gassing period" may amount to three or four hours and time delay relays and the like are difficult to make reliable when subjected to rough usage such as when incorporated in moving vehicles, while time switches are complicated and other devices which have been tried are unsatisfactory for various reasons.

The present invention provides a simple and reliable device which is capable of operation repeatedly and under some conditions of use for a long period without losing its efficiency. The device is suitable for use with A.C., D.C., motor generator sets and the like.

According to the present invention in a battery charger there is provided a cut-out for maintaining the charge during the "gassing period" and thereafter cutting out the charger current, said cut-out comprising a block of material having a substantial heat-absorbing capacity for a given rise of temperature and thermally insulated from its surroundings, a heater resistance and heat-operated contacts in said block, connections from the heat-operated contacts to the charging circuit to cut out charging current, and a relay operated by battery voltage, said relay being connected to the heater resistance to energise it upon the battery reaching a predetermined charging voltage.

Preferably means should be provided to maintain heat in the heat-absorbing block after cutting off the charging current, so that the heat-operated contacts do not reset after a time and resume charging.

By providing a variable resistance in series with the heat resistance, the length of the "gassing period" can be made readily adjustable. Similarly the operating voltage of the relay may be readily adjustable by means of a series rheostat and/or adjustable springs on the relay.

Alternatively the heat-operated contacts may be of the manual-resetting type, so that the controls do not reclose automatically after cooling.

The following is a description by way of example of one charger cut-out in accordance with the present invention.

Figure 1:
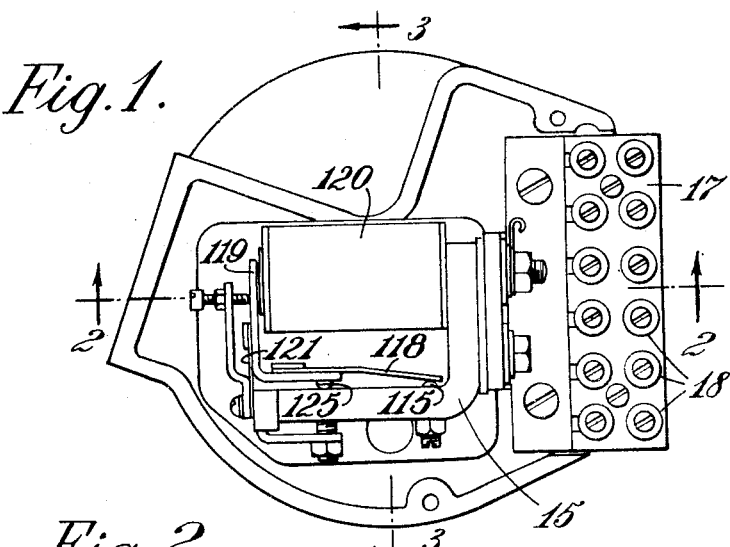
Figure 1 is a plan view of the charger cut-out with cover, screws and dust cover assumed removed.

The charger cut-out is intended for operating from alternating current mains through a transformer and rectifier, the rectifier being connected to the battery to charge it. The arrangement of the charging cut-out is as follows:

A casing 10 is provided which is made of die-cast material of cylindrical form and may be, say, about 3½" in diameter and 5" or so high and has a dust cover 11. The lower part of the casing is lined as shown at 12 with cork or other thermal insulation about ¾" thick and in the hollow space inside the cork there is inserted a heavy block of metal 13. The metal is drilled out towards one side to afford a space to receive a heater resistance 14 and the heater resistance is connected to the contacts 115, 125 of a relay 15 disposed in the space above the cork lining in the top of the casing 10.

The relay 15 has a contact member 118 which is spring-operated to open the contacts 115, 125 and an armature 119 under the influence of an electromagnetic winding 120 to close the contacts 115, 125 against the spring 121. Included in the casing is a terminal block 17 having a number of terminals 18 including terminals for the relay winding and terminals for connection to the said variable resistance 16 and the heater 14, so that the amount of the current in the heater may be varied, and in accordance with the setting of the variable resistance the time taken for the block of metal in which it is located to reach a certain temperature will be varied.

The block of metal 13 is hollowed out to receive a thermostat switch unit 19 which comprises a bimetallic strip which on heating will change the alternating current supply circuit to the transformer. The result of this arrangement is intended to be that upon the battery reaching a predetermined voltage the relay 15 will close and start the heater 14. When the metallic block 13 in which the heater 14 is located reaches a sufficient temperature it will operate the thermostat 19 and cut off the battery charging current. The time taken to effect this constitutes the "gassing period" and the "gassing period" can be shortened or lengthened by operating the variable resistance 16.

Figure 2:
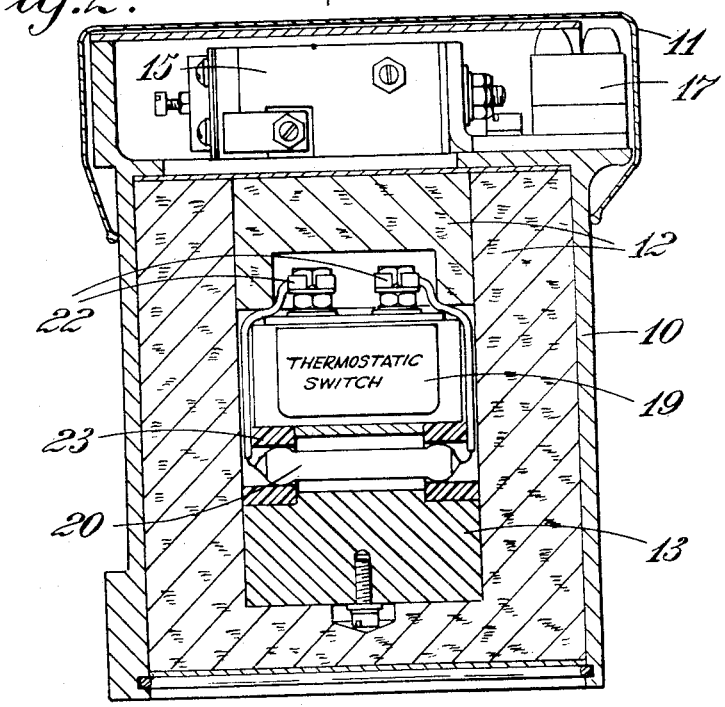
Figure 2 is a part sectional view on the line 2—2 of Figure 1, looking in the direction of the arrows.
Figure 3:
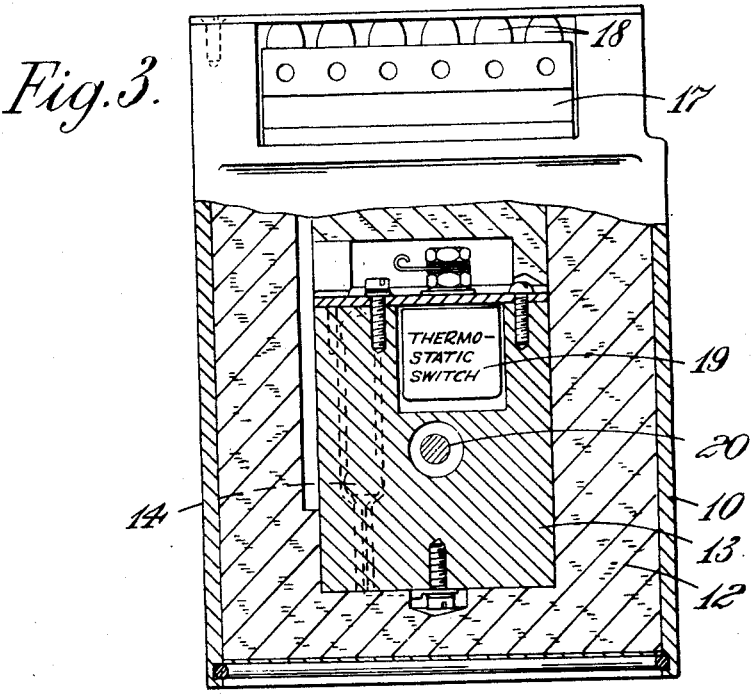
Figure 3 is a part sectional view on the line 3—3 of Figure 1, looking in the direction of the arrows, the dust cover being assumed removed.
Figure 4:
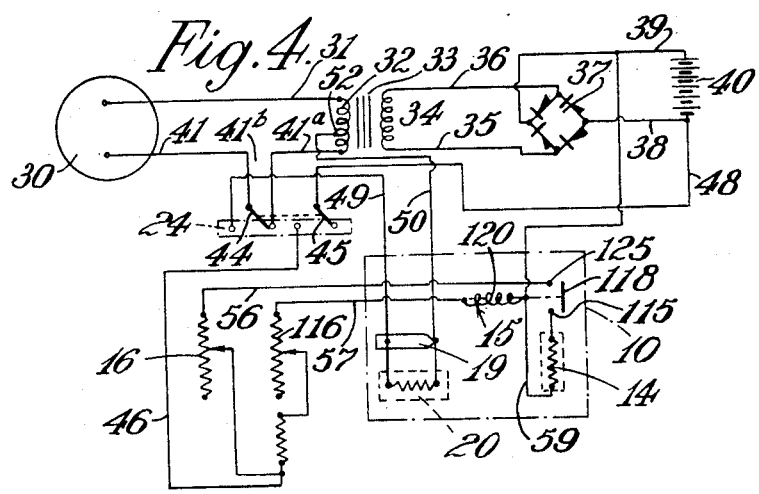
Figure 4 illustrates one battery charging circuit in which the charger cut-out can be employed.

In addition to the parts mentioned, the block of metal in the cork-insulated casing contains an insulated (23) secondary heater 20 connected across the terminals 22 (Figure 2) of the bimetallic switch 19 so that when the bimetallic switch opens to cut out the charging current supply, the secondary heater is automatically connected in circuit. This secondary heater 20 has a relatively high resistance and it has just sufficient heating effect to keep the heat-insulated metallic block at the requisite temperature to maintain the thermostat open until the charger is disconnected from the supply as by withdrawing the charger plug from the supply socket. The complete electrical charging connections are shown in Figure 4. A mains supply plug for alternating current mains is shown at 30, connected by line 31 to the primary winding 32 of transformer 33. The secondary 34 of the transformer is connected by lines 35, 36 to a rectifier 37 and the output of the rectifier is connected by lines 38, 39 to a battery 40 which is to be charged. There is a line 41, 41a from the plug 30 to the transformer primary winding 32 which is broken at 41b and connected to one pole of a double-pole changeover switch 24 having two switch arms 44, 45 which operate together. The arms are shown in the right-hand position, in which the lines 41, 41a are connected together. In this position the whole of winding 32 of the transformer is in circuit and the charging voltage of the secondary is therefore at a minimum. This gives a low-rate charge for hand control and the automatic cut-out 10 already described is, in this position of the circuit, not in action.

If the switch 24 is thrown over to the left, the arm 45 connects a line 48 from the positive battery terminal line 38 to a line 46 which leads to resistance 16 and thence by line 56 to contact 125 of relay 15. There is a branch line 57 through a variable resistance 116 to the relay magnet winding 120 and the current from resistance 14 is led by line 114 to the other terminal of the magnet winding and thence a line 59 goes to the negative battery terminal line 39. The other arm 44 of switch 24, in the left-hand position of the switch now being described, connects line 41 to a line 49 which leads to the thermostat switch unit 19, and the other terminal of the thermostat is connected by line 50 to a tapping 52 on the transformer primary 32. Thus the transformer voltage is higher than in the right-hand position of switch 24 and steps up the rate of charge, the thermostat is put in circuit, and the winding 120 of relay 15 is put in circuit across the battery terminals by way of line 48 from battery positive, arm 45 of switch 24, line 46, resistance 116, line 57, winding 120 and line 59 to the battery-negative. The resistance 116 is so adjusted that when the battery reaches full voltage the relay 15 closes contacts 125, 115 and heater resistance 14 is put in circuit to warm up the metal block 13. Charging current continues until (after gassing time provided for by the time taken to heat up the block 13) the thermostat 19 breaks its connection between lines 49 and 50. This puts the resistance 20 in series with the transformer winding 32 and reduces the voltage across battery terminals so that charging ceases. As the voltage across magnet 120 is also thereby reduced the relay contacts 125, 115 open and resistance 14 is cut out. The resistance 20 still keeps the block 13 warm enough to ensure that the thermostat 19 does not close the charging circuit again as long as plug 30 is left "on."

It will be seen that the relay 15, once it closes during the charging time, remains closed under normal conditions and keeps the heater unit 14 in operation until the bimetallic switch 19 is operated, but when the battery voltage falls off after the bimetallic switch has operated to cut off the charging current, the relay 15 will fall off within a short time as the battery voltage falls. As soon as the mains supply is disconnected manually from the charger, all heating ceases, and the block of metal cools down ready for the next charge. All this gear is sufficiently rugged to be mounted on an industrial truck and stand up to the shocks such trucks encounter in use without breaking down and so the charger can be fitted on the truck and the plug 30 plugged into alternating current mains anywhere. If charging can proceed in idle hours, say all night, the switch 24 is left in the position shown. If a quick charge is wanted the switch is thrown over to put the apparatus 10 in circuit and if time permits a full gassing period is automatically provided without allowing too much gassing, which might otherwise easily occur owing to the high rate of charge.

Another method of ensuring that the thermal switch is held open after the charging current has been cut off is to insert a resistance having a high temperature coefficient e.g. nickel or copper in parallel with the voltage sensitive relay the combination being in series with a suitable ballast resistance. The temperature sensitive resistance is fitted to the metal block and arranged to allow the relay to operate at a certain voltage when cold, but when the block gets hot, the increased resistance in the wire would shunt more current through the relay. Thus, although the charging current is cut off and a fall off in battery voltage results, the relay can still "hold in" due to its increased current supply. The heater therefore remains in circuit from the battery, so that the block maintains its heat and the thermal switch is kept open. In this case, the heater circuit is finally broken by removing the charging plug from the vehicle, whereby the charger circuit is isolated from the battery.

Again, a further bi-metal switch could be used to introduce a parallel resistance in the relay circuit when the block is hot. This would replace the temperature variable resistance in the previous example.

Furthermore, the main bi-metal switch could operate a relay having auxiliary contacts which cut off the mains supply to the charger and introduce a supply to the heater so that the block continues to be heated and the bi-metal switch stays open. Instead of the bi-metal switch with auxiliary contacts, a snap-action bi-metal switch of the change-over type could be used to cut off the charging supply and insert the heater as just mentioned.

We claim:

1. In a battery charger the provision of a cut-out to maintain charging current during the "gassing period" and thereafter cutting out the charger current, said cut-out comprising in combination a block of material having a substantial heat-absorbing capacity for a given rise of temperature and thermally insulated from its surroundings, a heater resistance and heat-operated contacts in said block, connections from the heat-operated contacts to the charging circuit to cut out charging current, and a relay operated by battery voltage, said relay being connected to the heater resistance to energise it upon the battery reaching a predetermined charging voltage.

2. A cut-out according to claim 1, wherein the heat-absorbing block is provided with means to maintain heat therein after the charging current has been cut off, thereby preventing the heat-operated contacts from resetting after a short time to resume charging.

3. A cut-out according to claim 2, wherein the means to maintain heat in the heat-absorbing block comprises a secondary heater connected across said heat-operated contacts so that when these latter cut off the charging current the secondary heater is automatically connected in circuit.

4. A cut-out according to claim 1, wherein the heater resistance is controlled by a variable resistance in series therewith so that the time taken for the heat-absorbing block to reach a given temperature can be varied, thereby providing variation of the "gassing period."

5. A cut-out according to claim 1, wherein the heat-operated contacts comprise a bi-metallic switch.

6. In a battery charger the provision of cut-out means to maintain charging current during the "gassing period" and thereafter to cut out said charging current, said cut-out means comprising in combination a block of material having a substantial heat-absorbing capacity for a given rise of temperature and thermally insulated from its surroundings, a heater resistance within said block, a relay operated by battery voltage, said relay being connected to said heater resistance to energise it upon the battery being charged reaching a predetermined charging voltage, a bi-metallic switch in the said block, connections from the switch to the charging circuit to cut out the charging current, and a secondary heater located within said block and connected across terminals of said switch, said secondary heater being automatically brought into circuit when the switch cuts out the charging current.

7. An electric battery charger cut-out switch comprising in combination, a casing, a heat-insulating lining therein, a block of material within the lining having substantial heat-absorbing capacity, an electrical heater unit for said block within the lining, a thermally-operated switch in heat-conductive relation to said block, said switch having contacts adequate to cut off charging current and terminals for connection in a charging circuit, a relay within the casing having an operating winding with terminals for connection across the battery to be charged and contacts operated by said relay for controlling the supply of current to said heater unit.

References Cited in the file of this patent

UNITED STATES PATENTS

| | | |
|---|---|---|
| 2,510,141 | Richards | June 6, 1950 |
| 2,796,577 | Arnot | June 18, 1957 |